Oct. 8, 1957    D. KAUFMAN ET AL    2,808,928
APPARATUS FOR UNDERWATER SCREENING
Filed July 6, 1954    4 Sheets-Sheet 1

INVENTORS
David Kaufman
George W. Lower

BY *Robert Ames Norton*
ATTORNEY

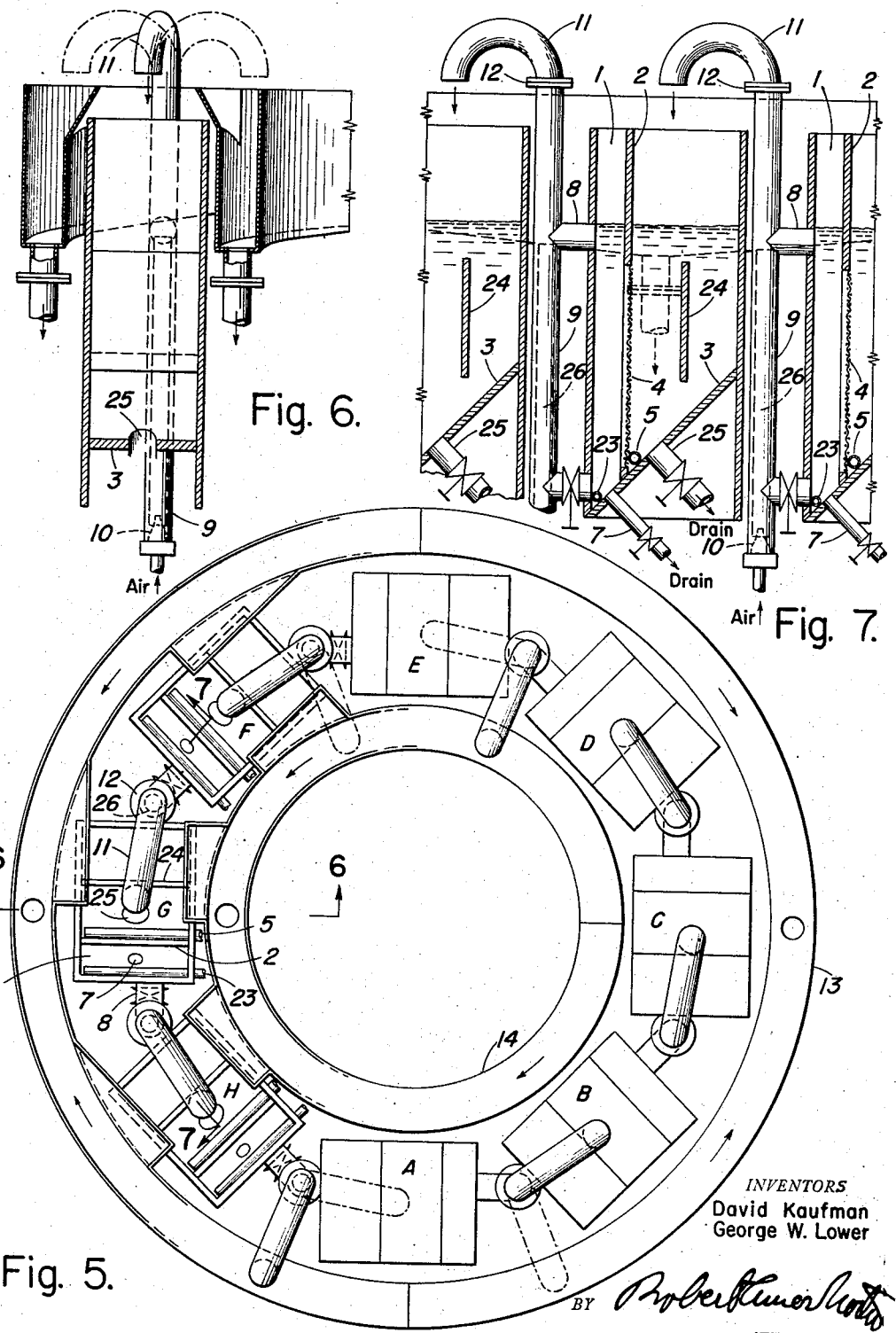

United States Patent Office 2,808,928
Patented Oct. 8, 1957

2,808,928

APPARATUS FOR UNDERWATER SCREENING

David Kaufman, Winchester, and George W. Lower, Lexington, Mass., assignors to American Cyanamid Company, New York, N. Y., a corporation of Maine Application July 6, 1954, Serial No. 441,356

5 Claims. (Cl. 209—17)

This invention relates to an improved device for screening and particularly for the separation of liquids and very fine solids from relatively coarser solids.

Screening to separate solids from liquids or solids of different sizes from each other is a common procedure particularly in the mineral art, where the apparatus of the present invention finds its most important field of utility. The separation of liquids from solids or of two solids of different sizes from each other presents a very simple problem in the larger sizes. However, when small particles are dealt with, and particularly when the screening is under liquid, great difficulty is encountered with very fine solids, which tend to cake and bridge over screen openings, resulting in blinding of the screen. The problem is even more serious when there are present solids of two different sizes because the tendency to blinding of screens is greater with solids of different particle size than with solids of a single particle size because of the closer packing resulting from a combination of fine and coarser solids.

A typical screening problem is presented in the cyanidation of slimy precious metal ores, for example saprolitic gold ores. Fine grinding is necessary, as is the case with the majority of precious metal ores; but the slimy pulp which results cannot be treated by ordinary cyanidation procedures because the filtration step which is necessary to separate the pregnant solution from the gangue tailings, is impractical with such slimy ores. As a result there has been developed a process in which the pulp is cyanided in the presence of relatively coarse particles of charcoal or activated carbon. The gold is dissolved, and it is almost immediately precipitated in the pores of the relatively large carbon particles. Finally a separation of the coarse carbon particles from the slimy ore particles becomes necessary. This can be effected with known types of equipment but presents a considerable problem particularly when it is attempted to effect the separation by screening.

Another type of cyanidation process, applicable particularly to slimy ores, substitutes coarse particles of ion exchange material for the charcoal. The ion exchange material adsorbs the gold from the cyanide solution and has the advantage that the gold can be removed by elution without destroying the adsorbed material as is the case when charcoal or activated carbon is employed.

The device of the present invention represents a marked advance in efficiency in screening, particularly in the solution of such problems as are presented by the carbon or ion exchange modification of the cyanidation process. Essentially, the present invention is directed to a two-compartment cell in which the compartments are separated by a substantially vertical dividing wall carrying a screen which is also substantially vertical; that is to say, the angle which it makes with the horizontal is so large that the vertical component of the screen angle is much greater than the horizontal. The material to be separated, for example a cyanided precious metal ore pulp containing the precious metal in relatively coarse carbon or ion exchange aggregates, is introduced into one compartment. The second compartment is provided with an overflow so that as feed is introduced into the first compartment, there is a tendency to overflow from the second compartment. If an ordinary screen were used, it would blind almost immediately. However, according to the present invention, it has been found that if a source of compressed gas, such as compressed air, is connected to a perforated pipe arranged across the bottom of the screen with openings positioned so that a turbulent film of bubbles passes across the screen at a flat angle, the screen remains scoured, the ore particles pass through readily, and the coarser carbon particles which are larger than the screen openings remain behind. The flow can be continuous until sufficient coarse particles build up in the first compartment to require emptying. The construction of the cell, which can be of cheap sheet material, is very economical, and high outputs for a given equipment investment are made possible.

The device of the present invention is useful over a wide range of particle sizes. There are, however, some limitations. The coarse particles must be at least two mesh sizes coarser than the screens, which in turn must be at least two mesh sizes coarser than the fine particles. If the screen openings approach the size of the coarse and fine particles closer than set out above, the advantages of the invention are not fully realized; as in such case, the scouring effect of the stream of bubbles over the screen is not sufficient to keep the openings of the screen completely clear.

The apparatus is even more efficient in cyanidation processes where the precious metal is adsorbed by ion exchange resins because in such cases, it is possible to extract the precious metal from the resin in the same equipment by extracting solution passed through the same cells and it is not necessary to remove the ion exchange resin.

It will be apparent from what has been described that the apparatus of the present invention can also be used to separate liquids from solids which are coarse enough to permit screens of practical mesh size. The advantage is not as great as in processes such as those described above where there is a separation of one size of solid in the form of a pulp from a coarser solid. However, for certain operations, such as with slimy material or materials which fracture to form flat plates, the apparatus of the present invention is advantageous.

Another advantage of the apparatus of the present invention is that it can be constructed of simple sheet material which can be highly resistant to corrosion, permitting separation with corrosive materials, such as liquors from the acid leaching of copper ores and the like.

The invention will be described in greater detail in connection with the drawings in which:

Fig. 5 is a diagrammatic illustration of a series of cells arranged for continuous operation;

Fig. 6 is a section through one of the cells of Fig. 5 along the line 6—6, and

Fig. 7 is a section through a series of cells along the line 7—7 of Fig. 5.

Figures 1, 2:
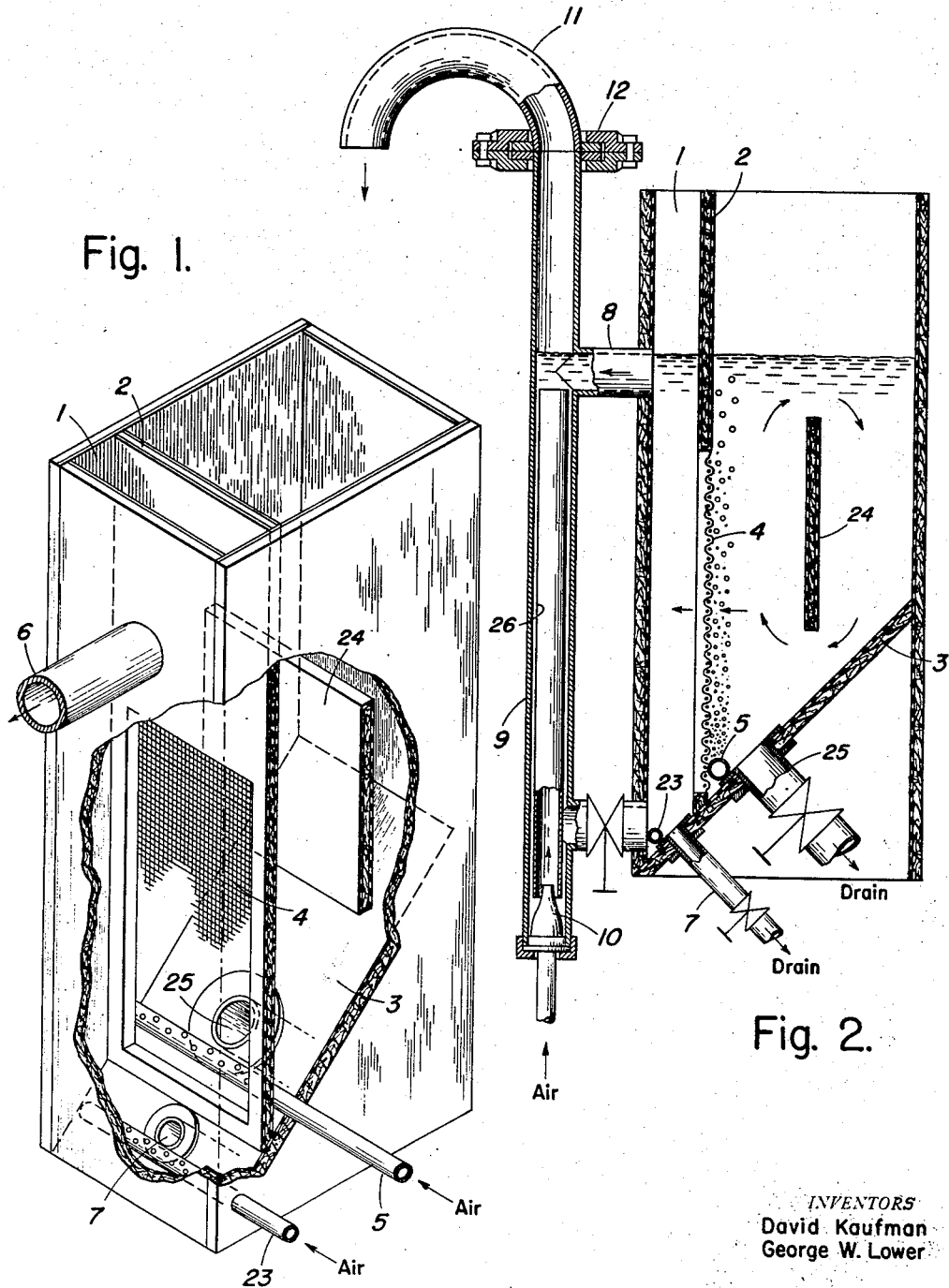
Fig. 1 is a perspective of a single cell.
Fig. 2 is a vertical section through a modified cell construction.

The cell in Fig. 1 is shown as provided with an outer chamber 1 in which an inner chamber is formed by the partition 2 and sloping bottom 3, provided with a valved drain 25. A vertical screen 4 is mounted in the partition 2, and a perforated pipe 5 at the bottom of screen 4 is connected to a source of compressed air (not shown).

The second compartment of the cell is provided with an overflow pipe 6 and a drain plug 7. Agitation of the material in this compartment is provided by a perforated pipe 23 also connected to the source of compressed air. The circulation in the inner chamber is accelerated by a baffle 24.

When the cell is used for the separation of coarse carbon from fine ore pulp in a cyanidation process, it may be used after cyanidation is complete for separation purposes only; or the cell may be of greater dimensions so that, if desired, the cyanidation itself may be effected in the first compartment. In such a case, the screen 4 is preferably closed off, for example by means of a slide (not shown). The compressed air pipe 5 and baffle 24 circulate the pulp in the cyaniding solution and at the same time provide the oxygen which is required at all times in a cyanidation operation. After cyanidation is complete and the precious metal ore is adsorbed in the coarse charcoal or carbon particles, the screen is opened and the ore pulp flows through into the second compartment, from which the overflow ore is drained. A constant level from the first compartment may be maintained by the introduction of sufficient water. After all of the ore pulp has passed through the screen, the coarse carbon particles may be removed and treated in the usual manner to recover precious metal values.

Fig. 2 illustrates a modified form of cell in which compartment 1 is provided with a pipe 8 opening from the upper part of compartment 1 at the desired liquid level and discharging into an air lift 9 provided with a standpipe 26, an air jet 10 and a curved spout 11 jointed at 12. The discharge by means of an air lift permits a closer control of the rate of flow through the cell and also is effective in a string of cells, permitting the cutting out of any cell at any time. It is also possible to turn the spout so that the air lift recirculates material into the inner compartment which is sometimes useful when a long period of residence in the compartment is necessary as with cyanidation operations, where the process proceeds very slowly over a time of many hours.

When it is necessary to empty the cell, this may be done through the valved drain pipes 7 and 25.

Figure 3:
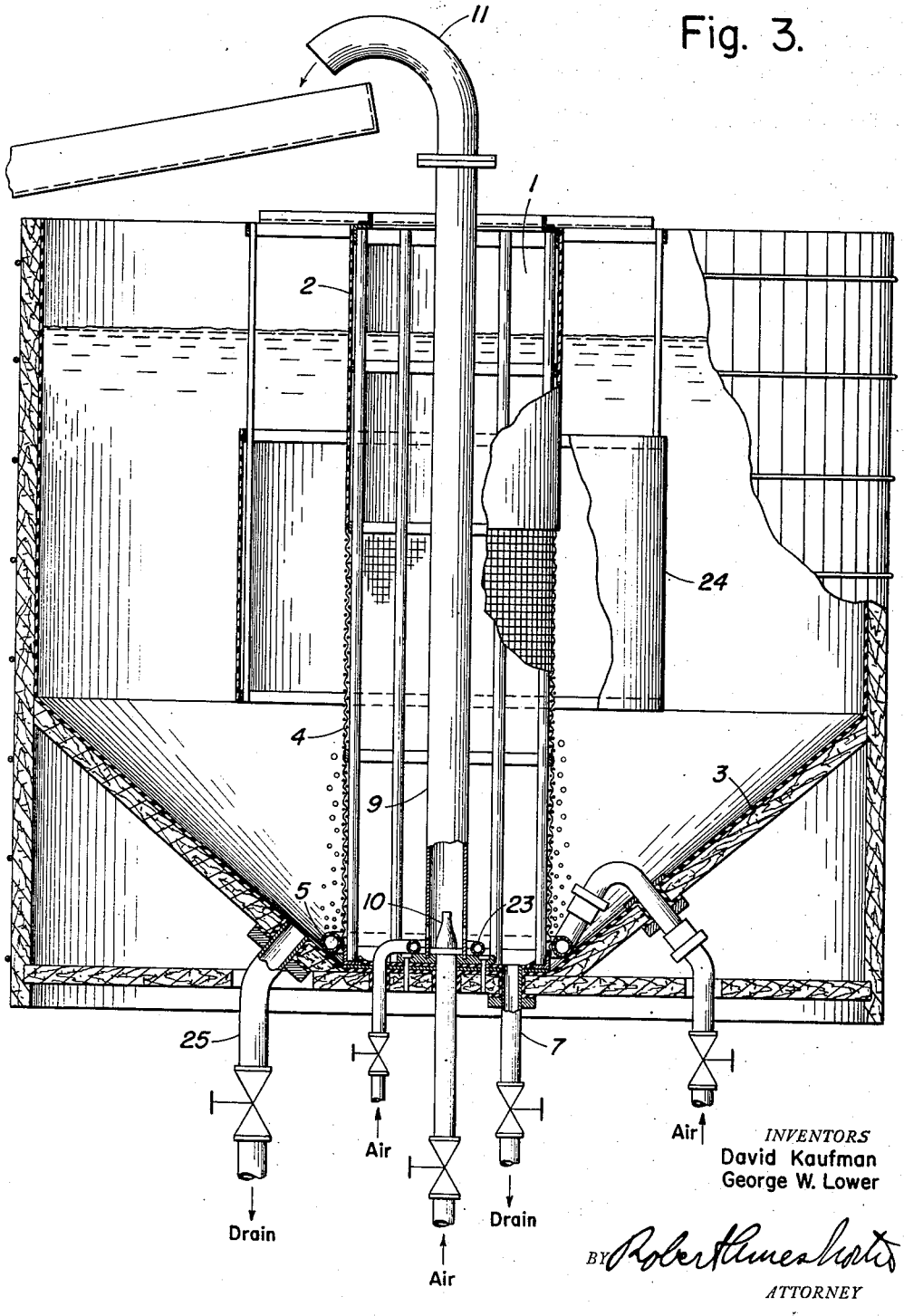
Fig. 3 is a vertical section through another form of cell.

Fig. 3 illustrates a different modification in which the screen is circular with the air lift in the center. The same parts bear the same reference numerals. The round cell has considerable advantages in very large sizes, as the distance which pulp has to flow to the screen from different parts of the pulp compartment are more nearly uniform. The outer shell which is essentially a cylindrical tank with a conical bottom is also a type which is readily available commercially and which can be built of wood staves when corrosive material is to be handled.

The description of the apparatus has been in conjunction with the coarse carbon cyanidation process in which the carbon has to be removed from the cell and burned in order to recover the gold. When ion exchange material is used in place of carbon, it is possible to remove the gold by elution in the same cell in which the adsorption from the cyanidation pulp took place. This is easily effected by passing a suitable eluting solution through the ion exchange material which is preferably in the form of resin beads. This modification possesses the advantage that the same cell is used for both adsorption and removal of adsorbed material from the coarse ion exchange material.

As has been pointed out above, it is possible to carry out cyanidation and precipitation in a continuous or semi-continuous manner. This is illustrated in Figs. 5 to 7, showing a series of cells having the modified structure which has been described in Fig. 2. The same parts bear the same reference numerals.

A series of eight cells are arranged in a circle as shown in Fig. 5 with two circular launders 13 and 14 on the outside and inside of the circle respectively. For clarity in describing the continuous operation, the cells are lettered from A to H counterclockwise around the circle. For simplicity pipes introducing cyanidation pulp feed and eluting fluid are not shown, as these parts are of conventional design and their particular construction forms no part of the present invention.

Beads of an ion exchange resin, capable of adsorbing the precious metal from the cyanidation pulp, are filled into the inner compartments of all eight cells. The beads are two meshes coarser than the screens 4. Finely divided cyanidation pulp is introduced into cell A. The air is turned on into the agitators and air lifts, thus agitating the beads and pulp and causing a continuous overflow through the air lift 9 into the inner compartment of cell B. The pulp passing through the screen into the outer compartment of the cell B is removed by the air lift and introduced into the inner compartment of cell C, and the same is repeated with cell D. The movable curved spout 11 of the air lift from cell D however is turned so that it discharges the pulp into the waste launder 14. The air lifts and feed are adjusted so that the time of dwell in each cell is sufficient to result finally in discharging substantially barren pulp into the launder 14.

While the adsorption cycle is carried on to completion in cells A to D, cells E to H contain resin beads which have been charged with gold from a previous cycle, cell H containing resin which has a maximum gold content and cells G, F, and E having successively lower gold contents. Eluting fluid is fed into cell E, and as it passes through the cell in which the beads are agitated by the compressed air flowing through the perforated pipes, it elutes a portion of the gold, passing on through the air lift and thence into cell F where the same procedure is repeated, the effluent passing on in turn to cell G and thence to cell H. The eluting liquid which has picked up as much gold as is desired is then directed by the curved spout 11 of the air lift of cell H into the outer launder 13 where the solution is passed to other equipment for recovery of its gold content, for example by precipitation with zinc and filtration. The eluting liquid is then made up and reused.

When the cycle through cells A to D has been completed which is shown by incomplete elimination of gold from the pulp discharged into the launder 14, cell D is taken out of the string and its spout turned so that it discharges into cell E. The spout in the air lift of cell E is turned to discharge into the launder 14 as shown in dotted lines, and similarly the spouts on the air lifts for cells H and A are turned into the positions shown in dotted lines so that the discharge from H is into the center compartment of cell A and from cell A into the launder 13. Feed of cyanidation pulp is now introduced into cell B and eluting fluid into cell F. The adsorption and elution cycle then proceeds as described above until cell B can no longer adsorb the gold to the desired degree. Then the procedure is repeated so that the feed goes to cell C; the discharge of barren pulp, in the launder 14 from cell F; the introduction of eluting fluid into cell G; and the discharge of the eluting liquid, from cell B into the launder 13.

The adsorption and elution cycles are frequently of different length, the cyanidation taking much longer. For simplicity in describing the operation of the apparatus, the same number of cells have been shown in each cycle. Of course, in practical operation where the cycles are of different length, different numbers of cells may be used.

Figure 4:
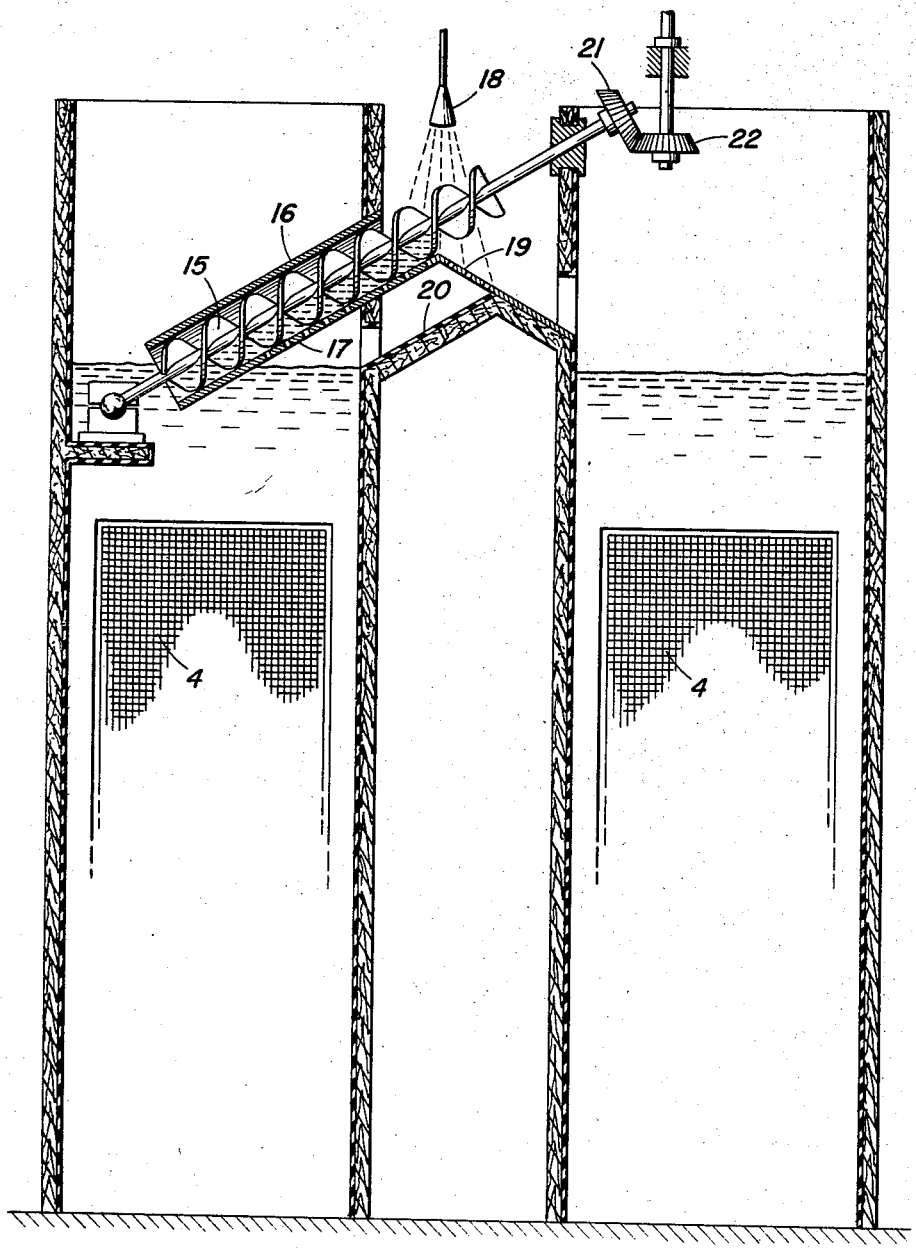
Fig. 4 is a section through a series of two cells of a string providing countercurrent flow of resin.

Fig. 4 shows a different modification, two cells being shown to illustrate modification, which is, of course, applicable to any number. In the modification described above in which a string of cells is used in a series, it is necessary to change the flow of cyanidation pulp and eluting solution when the resin in one cell of the string has become completely charged with precious metal and in the cells in which elution is carried out, the resin in one cell is completely eluted or eluted to the point where it is desired to reuse the resin. This necessitates the shifting of cyanidation pulp feed, elution feed and the air lift discharge from the cells at the end of each string. Thus a number of manual operations are necessary which requires more labor and precludes completely automatic operation. On the other hand, the resin particles are subjected to a minimum of attrition.

The modification shown in Fig. 4 in which two cells are shown side by side permits continuous operation. In these modified cells an Archimedes screw 15 turning in a cylinder 16 having a screen section 17 continuously lifts pulp and resin beads and drains the former through the screen openings 17 which are sufficiently large to pass pulp but small enough to retain the resin beads. If the screw passes beyond the side wall of the cell, it is subjected to a water spray 18 which washes off adherent pulp from the resin beads and permits draining back into the cell through the chute 20. Resin beads are then discharged by the screw on the perforated chute 19 which introduces them into the preceding cell. The drive of the screw may be any suitable means for example of bevel gears 21 and 22. Where a long string of cells is used, the drive of the gear 22 may be from a single source, not shown.

In the operation of a series of cells, it will be apparent that the pulp is moving in one direction being discharged from cell to cell by the air lifts which do not show in Fig. 4, whereas the resin beads are moved backwards through the cells countercurrently. Part of the cells can be arranged for cyanidation and part, often a much shorter string, for elution. The beads of pulp and eluting solution and discharge of barren pulp and pregnant elution solution remain fixed, the resin beads slowly moving backward around the string of cells. It is possible to arrange the cells so that they form a closed circle or circuit, the eluted resin from the first cell of the eluting string passing into the last cell of the cyanidation string or where the physical arrangement of a long series of cells in a circuit is structurally inconvenient, the barren resin beads discharged from the last of the cells in the eluting string can be slurried with a small amount of water and pumped back to the last cell of the cyanidation string. In each case, the essential feature of the modification, namely a movement of coarse adsorbing particles such as resin beads countercurrent to the flow of pulp and eluting solutions respectively is maintained.

Where the modification of Fig. 4 is used, it is desirable to keep the flow of resin beads from cell to cell substantially constant so that the amount of resin beads in each cell remains constant. This is easily effected by driving all of the screws at constant speed.

When used in cyanidation, the continuous modification illustrated in Fig. 4 may require a larger number of cells in the cyanidation string because this operation is relatively slower than the elution. In other operations where the adsorption rate and eluting rate bear a different relation to each other, the number of cells in each cycle can be adjusted.

Another method of handling continuously the adsorption and elution cycles which are of very different length is to adjust pulp feed and eluting liquid feed differently. Where a very long period of contact is necessary as in cyanidation, the pulp feed can be much slower than the feed of eluting liquid. However, it is usually more advantageous to vary the time of contact by the number of cells in the string, as it is advantageous with slower reactions, such as cyanidation, to provide for the much greater excess of adsorbing material which this arrangement permits.

In the specification and claims the terms "screen" and "screening" are used in their ordinary practical sense of a dividing wall having openings so small that a portion of the material confined thereby will not pass through the openings. It is not intended to cover a wall with openings so large that in ordinary use all components of the mixture confined thereby are capable of passing through the openings.

What is claimed is:

1. A multi-compartment screening cell, for separating fine solid components from coarse solid components in liquid suspensions thereof, comprising a feed compartment, an overflow compartment separated from each other by a predominantly vertical wall carrying a predominantly vertical screen, the apertures of which are intermediate in size between the sizes of the fine solid and coarse solid components of the feed material to be separated thereby, means for introducing a compressed gas into the feed compartment at points adjacent to and along the lower edge of said screen to direct a turbulent flow of gas bubbles over the surface of the screen at a flat angle and with a velocity sufficient to exert a scouring action on said surface.

2. A cell according to claim 1 in which the overflow compartment is provided with a drainage opening and an air lift whereby material removed from said compartment can be elevated.

3. A cell according to claim 2 in which the vertical screen is a cylindrical screen defining a cylindrical overflow compartment, and the air lift is positioned in the center of this cylindrical compartment.

4. A plurality of multi-compartment screening cells according to claim 1 arranged side by side and mechanical means for elevating a portion of the contents of the feed compartment of one cell, draining through a screen of substantially the same mesh as the vertical screen and discharging elevated coarse material into the feed compartment of the preceding cell.

5. A series of cells according to claim 4 in which washing means are provided for washing off adherent fine solids from elevated coarser solids before discharging into the preceding cell and means for causing said wash liquid to flow into the feed compartment of the first cell.

References Cited in the file of this patent

UNITED STATES PATENTS

| | | |
|---|---|---|
| Re. 5,346 | Welch | Apr. 1, 1873 |
| 331,304 | Kron | Dec. 1, 1885 |
| 642,460 | Kersten | Jan. 30, 1900 |
| 1,357,499 | Hunt | Nov. 2, 1920 |
| 1,401,598 | Gahl | Dec. 27, 1921 |
| 2,328,240 | Wiegand | Aug. 31, 1943 |
| 2,687,213 | MacLeod | Aug. 24, 1954 |